(12) United States Patent
Yoneda et al.

(10) Patent No.: US 11,269,313 B2
(45) Date of Patent: Mar. 8, 2022

(54) CONTROLLER AND CONTROL SYSTEM THAT STORES DATA IN CURRENT CONTROL CYCLE FOR OUTPUT IN NEXT CONTROL CYCLE

(71) Applicant: OMRON Corporation, Kyoto (JP)

(72) Inventors: Mitsuhiro Yoneda, Tenri (JP); Shigenori Sawada, Takatsuki (JP); Yasunori Fukuda, Ritto (JP)

(73) Assignee: OMRON CORPORATION, Kyoto (JP)

( * ) Notice: Subject to any disclaimer, the term of this patent is extended or adjusted under 35 U.S.C. 154(b) by 72 days.

(21) Appl. No.: 16/643,830

(22) PCT Filed: Feb. 1, 2019

(86) PCT No.: PCT/JP2019/003630
§ 371 (c)(1),
(2) Date: Mar. 2, 2020

(87) PCT Pub. No.: WO2019/171845
PCT Pub. Date: Sep. 12, 2019

(65) Prior Publication Data
US 2021/0064003 A1 Mar. 4, 2021

(30) Foreign Application Priority Data
Mar. 9, 2018 (JP) .............................. JP2018-042676

(51) Int. Cl.
*G05B 19/4155* (2006.01)
*G05B 19/408* (2006.01)
*G06F 9/48* (2006.01)

(52) U.S. Cl.
CPC ....... *G05B 19/4155* (2013.01); *G05B 19/408* (2013.01); *G05B 2219/31368* (2013.01); *G06F 9/4887* (2013.01)

(58) Field of Classification Search
CPC .............. G05B 19/4155; G05B 19/408; G05B 2219/31368; G05B 19/05; G06F 9/4887; G06F 9/48
See application file for complete search history.

(56) References Cited

U.S. PATENT DOCUMENTS

2012/0224591 A1* 9/2012 Tsunedomi ....... H04L 12/40026
 370/459
2012/0243585 A1* 9/2012 Matsui .................. H04J 3/0658
 375/219

(Continued)

FOREIGN PATENT DOCUMENTS

EP 2816428 A1 12/2014
EP 3076293 A2 10/2016

(Continued)

OTHER PUBLICATIONS

English translation of the International Search Report("ISR") of PCT/JP2019/003630 dated Apr. 9, 2019.

(Continued)

*Primary Examiner* — Kenneth M Lo
*Assistant Examiner* — Jonathan Michael Skrzycki
(74) *Attorney, Agent, or Firm* — Metrolex IP Law Group, PLLC (57) ABSTRACT

A controller includes a processor and a communication circuit. The controller controls an object of control by sequentially repeating, on a predetermined control cycle, the transmission of the output data, the reception of the input data, and execution of a control program for generating the output data using the input data. In the transmission of the output data, the processor executes: storing of the output data in a frame, the output data having been generated by the execution of the control program in a previous control cycle; and control of the communication circuit such that the frame, in which the output data is stored, is transmitted to the (Continued)

object of control. The processor executes, in a current control cycle, at least a part of the storing of the output data in a frame that is to be executed in a next control cycle.

6 Claims, 8 Drawing Sheets

(56) References Cited

U.S. PATENT DOCUMENTS

| | | | |
|---|---|---|---|
| 2014/0005835 A1 | 1/2014 | Nishiyama et al. | |
| 2014/0012402 A1* | 1/2014 | Nishiyama | G06F 9/4887 |
| | | | 700/86 |
| 2015/0058432 A1* | 2/2015 | Mizutani | G05B 19/0423 |
| | | | 709/208 |
| 2017/0099158 A1 | 4/2017 | Mizutani et al. | |
| 2018/0272528 A1 | 9/2018 | Kida et al. | |

FOREIGN PATENT DOCUMENTS

| | | |
|---|---|---|
| JP | 2012-194662 A | 10/2012 |
| JP | 2016-149645 A | 8/2016 |
| JP | 2017-161994 A | 9/2017 |
| WO | 2014/022203 A1 | 2/2014 |
| WO | 2015/133175 A1 | 9/2015 |

OTHER PUBLICATIONS

Written Opinion("WO") of PCT/JP2019/003630 dated Apr. 9, 2019.
Office Action dated Jun. 1, 2021 in a counterpart Japanese patent application.
Extended European search report (EESR) dated Oct. 20, 2021 in a counterpart European patent application.

* cited by examiner

CONTROLLER AND CONTROL SYSTEM THAT STORES DATA IN CURRENT CONTROL CYCLE FOR OUTPUT IN NEXT CONTROL CYCLE

TECHNICAL FIELD

The present disclosure relates to a controller that controls an object of control, and a control system including the same.

BACKGROUND ART

In production sites, various factory automation (FA) techniques are widely used. Such an FA system includes a controller, such as a programmable controller (PLC). The controller exchanges data, via a network, with one or more devices (typically a remote input/output (I/O) device, a servomotor driver, or the like).

For such a controller, there is a desire for accurate synchronization of the acquisition of input data and the output of control command. In order to meet such a desire, a controller and a device, connected to each other via a network, have their respective internal clocks which are kept time-synchronized. The controller and the device adjust the transmission timing and reception timing based on their synchronized clocks.

In such a time-synchronized configuration, the controller executes, for each control cycle, an input/output process that includes: receiving input data collected at the device; and transmitting a control command generated at the controller to the device. For example, Japanese Patent Laying-Open No. 2012-194662 (PTL 1) discloses a configuration for controlling an object of control by repeating, on a control cycle, the transmission of a control command, the reception of input data, and the execution of a control program (a user program and a motion calculation program) for generating a control command using the input data.

CITATION LIST

Patent Literature

PTL 1: Japanese Patent Laying-Open No. 2012-194662

SUMMARY OF INVENTION

Technical Problem

In the above-described controller, the input/output process is implemented by a software process performed by a processor, including, for example, a central processing unit (CPU). In the software process, there may arise variation in the processing time required for processing a certain amount of data, depending on the processing capacity of the processor. Accordingly, in the input/output process, when a frame including a control command stored therein is transmitted to a device, there may arise variation in the timing of frame transmission from the controller to the network.

If such variation in the processing time accounts for a prescribed proportion of the whole processing time, an increased amount of data to be processed will cause greater variation in the processing time. Accordingly, in the transmission of a control command to a device, an increased amount of data to be processed by the processor may cause greater variation in the timing of frame transmission from the controller to the network. The variation in the timing of frame transmission from the controller to the network may, in turn, affect the timing of frame reception at the device on the network. This may decrease the accuracy of synchronization among a plurality of devices.

Thus, in the controller, the amount of data processing in the software process greatly affects the degree of variation in the timing of frame transmission, making it difficult to ensure the timing of frame transmission.

An object of the present disclosure is to provide a new configuration for ensuring the timing of frame transmission in a controller.

Solution to Problem

A controller according to an example of the present disclosure is a controller that controls an object of control, the controller including a processor and a communication circuit. The communication circuit executes transmission of output data to the object of control, and reception of input data from the object of control. The controller controls the object of control by sequentially repeating, on a predetermined control cycle, the transmission of the output data, the reception of the input data, and execution of a control program for generating the output data using the input data. In the transmission of the output data, the processor executes: storing of the output data in a frame, the output data having been generated by the execution of the control program in a previous control cycle; and control of the communication circuit such that the frame, in which the output data is stored, is transmitted to the object of control. The processor executes, in a current control cycle, at least a part of the storing of the output data in a frame that is to be executed in a next control cycle.

According to the present disclosure, the scheduling for the transmission process is executed, so that at least a part of the software process included in the transmission process that is to be executed in the next control cycle is executed in the current control cycle. Accordingly, in the next control cycle, the amount of data processing in the software process to be executed in the transmission process is reduced, which results in reduction of the variation in the processing time required for the software process. With the reduced variation in the processing time, the variation in the timing of frame transmission can also be reduced, thus ensuring the timing of frame transmission. This can, in turn, reduce the variation in the timing of frame reception at a device on the network. Accordingly, the accuracy of synchronization among a plurality of devices can be ensured.

Further, according to the present disclosure, the timing of frame transmission can be ensured without modifying the existing protocol stacks and hardware.

In the above-described disclosure, the processor executes, in the current control cycle, the storing of the output data in a frame that is to be executed in the next control cycle, after the execution of the control program. When the next control cycle starts, the processor further executes the control of the communication circuit.

According to this disclosure, the scheduling for the transmission process is executed, so that the storing of output data in a frame, which may cause variation in the timing of frame transmission, is moved forward using the remaining time after the execution of the control program. Accordingly, in the next control cycle, the variation in the timing of frame transmission from the controller is reduced, thus ensuring the timing of frame transmission.

In the above-described disclosure, the processor executes, in the current control cycle, a part of the storing of the output data in a frame that is to be executed in the next control cycle. When the next control cycle starts, the processor further sequentially executes a remaining part of the storing of the output data in a frame, and the control of the communication circuit.

According to this disclosure, the scheduling for the transmission process is executed, so that a part of the software process included in the transmission process that is to be executed in the next control cycle is executed in the current control cycle. Accordingly, in the next control cycle, the amount of data processing in the software process to be executed in the transmission process is reduced. This can reduce the variation in the processing time in the processor, thus ensuring the timing of frame transmission.

In the above-described disclosure, the storing of the output data in a frame includes generation of the frame, and storing of the output data in the generated frame. The controller exchanges data with another device via a higher-level network. When the output data is updated as a result of the exchange of data with the other device after the execution of the control program in a control cycle, the processor executes, in the current control cycle, the generation of the frame that is to be executed in the next control cycle, after the execution of the reception of the input data and before the execution of the control program. When the next control cycle starts, the processor further executes the storing of the output data.

According to this disclosure, when the output data is updated as a result of the exchange of data between the controller and another device via the higher-level network in a control cycle, the amount of data processing in the software process to be executed in the transmission process in the next control cycle can be reduced. This can reduce the variation in the processing time in the processor, thus ensuring the timing of frame transmission.

In the above-described disclosure, the storing of the output data in a frame includes generation of the frame, and storing of the output data in the generated frame. The controller exchanges data with another device via a higher-level network. When the output data is updated as a result of the exchange of data with the other device after the execution of the control program in a control cycle, the processor executes, in the current control cycle, the storing of the output data in a frame that is to be executed in the next control cycle, after the execution of the control program and before the execution of the exchange of data with the other device. When the next control cycle starts, the processor further sequentially executes storing of the updated output data in the frame, and the control of the communication circuit.

According to this disclosure, when the output data is updated as a result of the exchange of data between the controller and another device via the higher-level network in a control cycle, the amount of data processing in the software process to be executed in the transmission process in the next control cycle can be reduced. This can reduce the variation in the processing time in the processor, thus ensuring the timing of frame transmission.

A control system according to an example of the present disclosure includes a controller and one or more devices that work in accordance with a control command from the controller. The controller and the one or more devices have their respective timers that are time-synchronized with each other. The controller includes: a processor; and a communication circuit that executes transmission of the control command to the one or more devices, and reception of input data from the one or more devices. The controller controls the one or more devices by sequentially repeating, on a predetermined control cycle, the transmission of the control command, the reception of the input data, and execution of a control program for generating the control command using the input data. In the transmission of the control command, the processor executes storing of the control command in a frame, the control command having been generated by the execution of the control program in a previous control cycle; and control of the communication circuit such that the frame, in which the control command is stored, is transmitted to the one or more devices. The processor executes, in a current control cycle, at least a part of the storing of the control command in a frame that is to be executed in a next control cycle.

According to the present disclosure, the controller executes the scheduling for the transmission process, so that at least a part of the software process included in the transmission process that is to be executed in the next control cycle is executed in the current control cycle. Accordingly, in the next control cycle, the amount of data processing in the software process to be executed in the transmission process is reduced, thereby reducing the variation in the processing time. This can ensure the timing of frame transmission at the controller, thus ensuring the accuracy of synchronization among a plurality of devices.

Advantageous Effects of Invention

According to an example of the present disclosure, a new configuration can be provided for ensuring the timing of frame transmission in a control cycle.

DESCRIPTION OF EMBODIMENTS

Embodiments of the present invention will now be described with reference to the drawings. In the following description, like reference signs indicate like parts and components. Their names and functions are also the same. Hence, the detailed description of them is not repeated. The embodiments and variations described below can be selectively combined as appropriate.

A. Application

Figure 1:
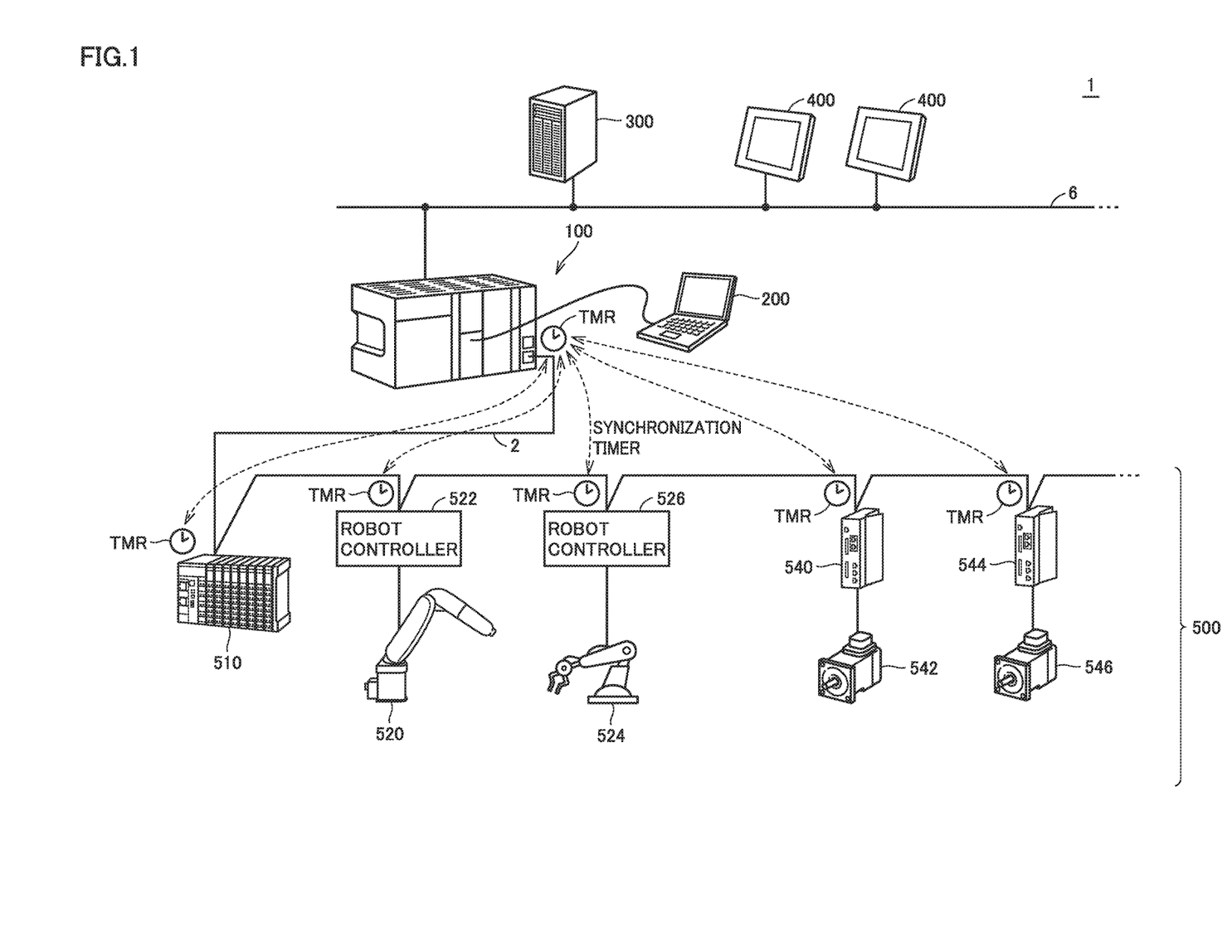
FIG. 1 is a diagram schematically showing a general configuration example of a control system in the present embodiment.
Figure 2:
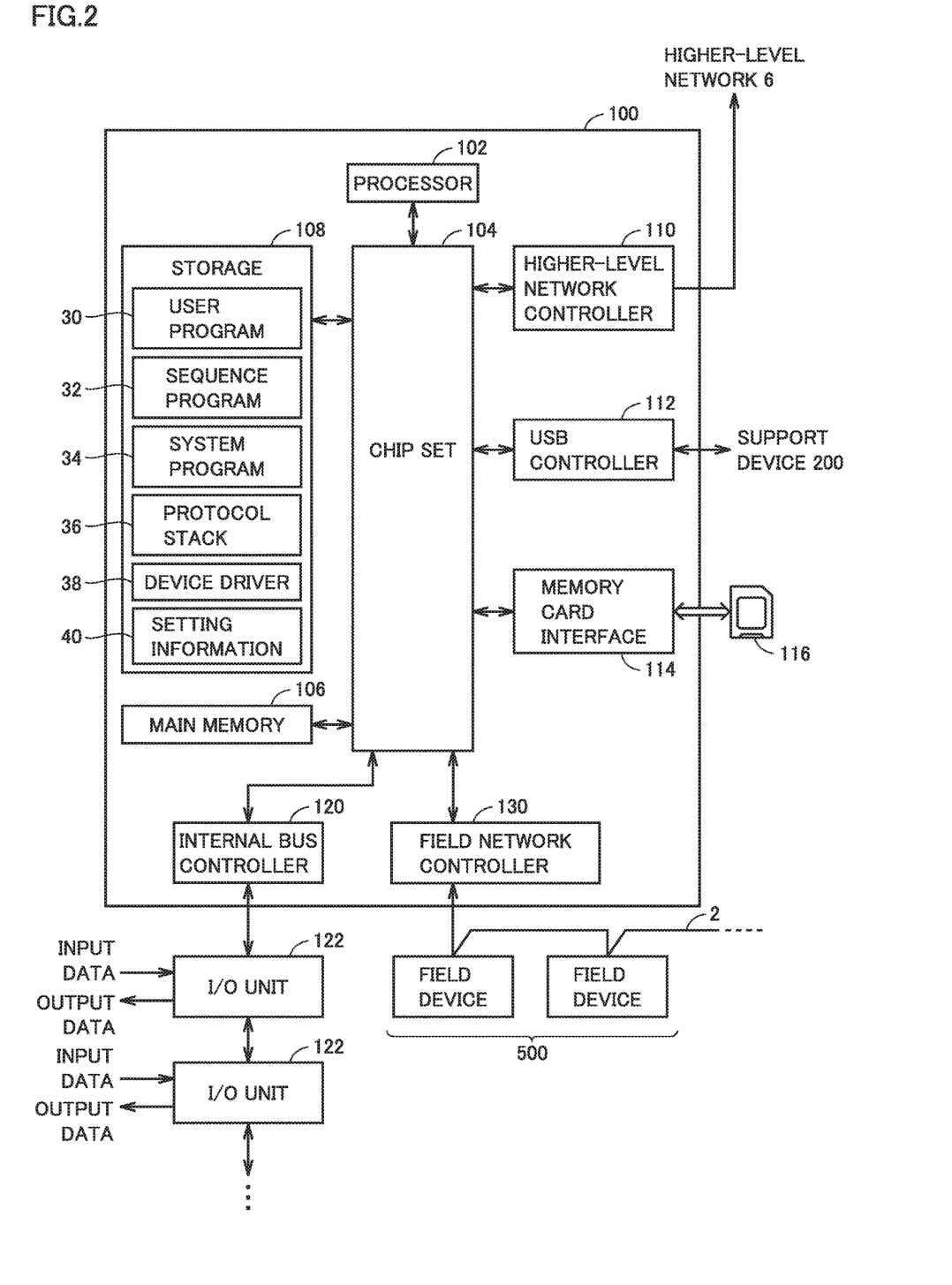
FIG. 2 is a block diagram showing a hardware configuration example of a controller in the present embodiment.

First, with reference to FIGS. 1 and 2, an example to which the present invention is applicable is described.

FIG. 1 is a diagram schematically showing a general configuration example of a control system 1 in the present embodiment. FIG. 1 shows control system 1 including a controller 100 in the present embodiment centered therein.

With reference to FIG. 1, controller 100 corresponds to an industrial controller that controls an object of control, such as various types of equipment and devices. Controller 100 is a type of computer that executes control calculation as described below, and may typically be embodied in a programmable controller (PLC). Controller 100 may be connected to various field devices 500 via a field network 2. Controller 100 exchanges data with one or more field devices 500 via, for example, field network 2. The term "field network", which is also generally called a "field bus", is hereinafter called a "field network" as a generic term for the sake of simplicity. That is, the term "field network" as used herein is a concept that can include not only a "field network" in the narrow sense but also a "field bus".

Field network 2 is preferably a bus or network which performs fixed-cycle communication ensuring the data arrival time. Known examples of such buses or networks which perform fixed-cycle communication include EtherCAT (registered trademark), EtherNet/IP (registered trademark), DeviceNet (registered trademark), and CompoNet (registered trademark).

Any field device 500 can be connected to field network 2. Field devices 500 include an actuator that provides some physical action on a manufacturing system and production line (hereinafter also referred to as a "field" as a generic term), and an input/output device that exchanges information with the field.

If EtherCAT (registered trademark) is employed for field network 2, at least one of the nodes connected to field network 2 serves as a "master", and the other nodes serve as "slaves". A node serving as a "master" manages the timing of frame transfer in field network 2.

In the example shown in FIG. 1, controller 100 serves as a "master", and the other field devices 500 serve as "slaves". In field network 2 having a master-slave configuration, the nodes have their respective timers TMR which are time-synchronized with one another, and the timing of frame transfer is determined based on the time (practically, the counter value) shown by timer TMR of each node.

In the configuration shown in FIG. 1, field devices 500 connected to field network 2 include a remote input/output (IO) device 510, robot controllers 522, 526, and servo drivers 540, 544.

Robot controllers 522, 526 and servo drivers 540, 544 correspond to one or more actuators (devices) that work in accordance with a control command from controller 100. The control command for each of servo drivers 540, 544 is generated in accordance with a motion command contained in a sequence program executed in a cyclic manner in controller 100.

In the example shown in FIG. 1, one or more actuators, which work in accordance with a control command from controller 100, are also connected to field network 2. This is, however, not a limitation. Any connection form may be possible if one or more actuators can receive the control command from controller 100. For example, the control command may be provided, via a signal line, from remote IO device 510 connected to field network 2.

FIG. 2 is a block diagram showing a hardware configuration example of controller 100 in the present embodiment. With reference to FIG. 2, controller 100 in the present embodiment, which is a processing unit called a "CPU unit", includes a processor 102 and a field network controller 130.

Field network controller 130 controls the exchange of data with field device 500 via field network 2. The exchange of data includes: transmitting data, such as a control command, from controller 100 to field device 500 (hereinafter also referred to as "output data"); and receiving, by controller 100, data collected or generated at field device 500 (hereinafter also referred to as "input data"). Field network controller 130 corresponds to an example of the "communication circuit".

Controller 100 is configured to control field device 500 by sequentially repeating, on a predetermined control cycle, the transmission of output data, the reception of input data, and the execution of a control program for generating output data using the input data.

The control program described herein includes a user program created in accordance with the purpose of control by the user, and a sequence program for implementing the purpose of control by the user in cooperation with the user program. The sequence program may include at least one of a sequence instruction and a motion instruction. The sequence instruction is a term that includes one or more instructions described by one or more logic circuits that calculate an input value, an output value, an internal value, and the like. The motion instruction is a term that includes one or more instructions for calculating, as a control command for an actuator (e.g., a servomotor), the numerical values of a position, a velocity, an acceleration, a jerk, an angle, an angular velocity, an angular jerk, and the like.

In one control cycle, the sequence program is executed with the user program. The control command, which is output by the execution of the sequence program for each control cycle, typically includes a digital output of ON/OFF determined in accordance with the sequence instruction, and an analog output calculated in accordance with the motion instruction.

In controller 100 in the present embodiment, in the transmission of output data, processor 102 is configured to execute: (1) the storing of output data (control command) in a frame, the output data having been generated by the execution of the control program in the previous control cycle; and (2) the control of field network controller 130 such that the frame, in which the output data is stored, is transmitted to field device 500. In this configuration, the processor is further configured to execute, in the current control cycle, at least a part of (1) the storing of output data in a frame that is to be executed in the next control cycle.

In the transmission of output data, (1) the storing of output data in a frame is implemented by processor 102's software process. Accordingly, there may arise variation in the processing time, depending on the processing capacity of processor 102. Therefore, there may arise variation in the timing of frame transmission from controller 100 to field network 2. If such variation in the processing time accounts for a prescribed proportion of the whole processing time, an increased amount of data to be processed by processor 102 will cause greater variation in the processing time. This may result in greater variation in the timing of frame transmission.

The variation in the timing of frame transmission from controller 100 may, in turn, affect the timing of reception of the output data at field device 500 on field network 2. This may decrease the accuracy of synchronization among a plurality of field devices 500. Thus, in controller 100, the amount of data processing in the software process greatly affects the degree of variation in the timing of frame transmission, making it difficult to ensure the timing of frame transmission.

In controller 100 in the present embodiment, scheduling for the transmission process is performed, so that at least a part of the software process included in the transmission process that is to be executed in the next control cycle is executed in the current control cycle. This can reduce the amount of data processing in the software process in the transmission process to be executed when the next control cycle starts, thereby reducing the variation in the processing time. With the reduced variation in the processing time, the variation in the timing of frame transmission can also be reduced, resulting in ensuring the timing of frame transmission in a control cycle. This can ensure the timing the reception of output data at field device 500 on field network 2, thus ensuring the accuracy of synchronization among a plurality of field devices 500.

As a specific application of the present invention, the configuration and processes of control system 1 in the present embodiment will now be described in more detail.

B. General Configuration Example of Control System

First, a general configuration example of control system 1 shown in FIG. 1 is described in more detail.

In the configuration example shown in FIG. 1, servo drivers 540, 544 respectively drive servomotors 542, 546 in accordance with a control command from controller 100 (e.g., a position command or velocity command).

A robot controller 522 drives a robot 520, and a robot controller 526 drives a robot 524. Robot controllers 522, 526 calculate the trajectory and the angle of each axis in accordance with a control command from controller 100 (e.g., a position command or velocity command), and drive servomotors constituting robots 520, 524 in accordance with the calculation results.

Remote IO device 510 typically includes a communication coupler that performs communication via field network 2, and an input/output unit (hereinafter also referred to as an "I/O unit") that acquires input data and outputs output data. Remote IO device 510 can connect to devices that collect input data, such as input relays and various sensors (e.g., analog sensors, temperature sensors, and vibration sensors); and devices that provide some action on fields, such as output relays, contactors, servo drivers, and any of other actuators.

Field device 500 is not limited to the above-listed examples, but may be any device that collects input data (e.g., a visual sensor) and any device that provides some action in accordance with output data (e.g., an inverter).

Data is exchanged between controller 100 and field device 500 via field network 2. The exchanged data is updated on a very short cycle, such as on the order of several hundreds of microseconds to several tens of milliseconds. The exchange of data includes receiving, by controller 100, data collected or generated at field device 500 (i.e., input data); and transmitting data, such as a control command, from controller 100 to field device 500 (i.e., output data). The process for updating such exchanged data corresponds to the "input/output process".

Controller 100 may be connected to other devices via a higher-level network 6. For higher-level network 6, a commonly used network protocol may be employed, such as Ethernet (registered trademark) or EtherNet/IP (registered trademark). Specifically, one or more servers 300 or one or more displays 400 may be connected to higher-level network 6.

Server 300 may be a database system, a manufacturing execution system (MES), or the like. The manufacturing execution system acquires information from a manufacturing system and equipment to be controlled, thereby monitoring and managing the whole production. The manufacturing execution system can also handle order information, quality information, shipment information, or the like. This is, however, not a limitation. A device that provides an information-related service may be connected to higher-level network 6. The information-related service may be a process for acquiring information from a manufacturing system and equipment to be controlled, and conducting macro or micro analysis. Examples of such information-related services may include: data mining for extracting some characteristic tendency included in the information from a manufacturing system and equipment to be controlled; and machine learning tools for machine learning based on the information from equipment and machines to be controlled.

Display 400 receives a manipulation from the user and outputs, to controller 100, a command in accordance with the user's manipulation. Display 400 also graphically represents calculation results from controller 100.

Further, a support device 200 is connectable to controller 100. Support device 200 is a device that supports preparation necessary for controller 100 to control an object of control. Specifically, for example, support device 200 provides: a development environment for a program to be executed on controller 100 (e.g., a tool for creating and editing programs, a parser, and a compiler); a setting environment for setting parameters configurations) of controller 100 and various devices connected to controller 100; a function for outputting a created sequence program to controller 100; and a function for correcting and modifying, online, the sequence program to be executed on controller 100.

C. Hardware Configuration Example of Controller

A hardware configuration example of controller 100 in the present embodiment will now be described. FIG. 2 is a block diagram showing a hardware configuration example of controller 100 in the present embodiment.

With reference to FIG. 2, controller 100, which is a processing unit called a "CPU unit", includes a processor 102, a chip set 104, a main memory 106, a storage 108, a higher-level network controller 110, a universal serial bus (USB) controller 112, a memory card interface 114, an internal bus controller 120, and a field network controller 130.

Processor 102 is configured with, for example, a central processing unit (CPU), a micro processing unit (MPU), and a graphics processing unit (GPU). Processor 102 may be composed of a plurality of cores, or a plurality of processors 102 may be provided. That is, controller 100 includes one or more processors 102 and/or processor 102 having one or more cores. Chip set 104 controls processor 102 and peripheral elements, thereby implementing the processes of overall controller 100. Main memory 106 is configured with, for example, a volatile storage device, such as a dynamic random access memory (DRAM) and a static random access memory (SRAM). Storage 108 is configured with, for example, a nonvolatile storage device, such as a hard disk drive (HDD) and a solid state drive (SSD).

Processor 102 reads various programs stored in storage 108 and develops the programs in main memory 106 for execution, thereby implementing the control adapted to an object of control and the various processes as described later.

Storage 108 stores a sequence program 32 and a user program 30 created to be adapted to a manufacturing system and equipment to be controlled, and setting information 40; as well as a system program 34 for implementing basic functions.

System program 34 is a collection of software for providing the functions as controller 100. Specifically, system program 34 includes a scheduler program, an input/output process program, and other system programs.

Sequence program 32 is a concept including a program that can be entirely scanned for each execution and output a control command for each execution. Sequence program 32 may contain a sequence instruction and/or a motion instruction. Basically, sequence program 32 is created by the user as desired in accordance with an object of control and application.

User program 30 is created in accordance with the purpose of control by the user. That is, user program 30 is a program designed as desired in accordance with a line (process) to be controlled by control system 1. User program 30 implements the purpose of control by the user in cooperation with sequence program 32. That is, user program 30 implements a programmed operation using, for example, an instruction, a function, and a functional module provided by sequence program 32. Accordingly, user program 30 and sequence program 32 may be called a "control program" as a generic term.

Setting information 40 includes information that defines the configuration and settings of control system 1 including controller 100. The setting information includes: information on the user program and setting values associated with field device 500 connected to field network 2; and information on the user program and setting values associated with a device connected to higher-level network 6.

Storage 108 further stores a protocol stack 36 constituted of a hierarchy of a plurality of protocols that define the procedure and exchange of communication on field network 2; and a device driver 38 that controls field network controller 130.

Higher-level network controller 110 controls the exchange of data with, for example, server 300 and display 400 (see FIG. 1), via higher-level network 6. USB controller 112 controls the exchange of data with support device 200 via USB connection.

Memory card interface 114 is configured to removably receive a memory card 116 and can write data to memory card 116 and read various types of data (e.g., sequence program 32 and user program 30) from memory card 116.

Internal bus controller 120 controls the exchange of data with I/O unit 122 attached to controller 100. Specifically, internal bus controller 120 serves as a transmission buffer for the data to be output to I/O unit 122 (output data), and as a reception buffer for the data input from I/O unit 122 (input data). The output data generated from calculation by processor 102 is primarily stored in storage 108. The output data to be transferred to a particular I/O unit 122 is read from storage 108 and temporarily held in the transmission buffer. The input data transferred from I/O unit 122 is temporarily held in the reception buffer and is then transferred to storage 108. Further, internal bus controller 120 transmits the output data from the transmission buffer to I/O unit 122, and receives the input data from I/O unit 122 and stores it in the reception buffer. Internal bus controller 120 typically provides the functions of a physical layer and a data link layer in the internal bus.

Field network controller 130 controls the exchange of data with field device 500 via field network 2. Specifically, field network controller 130 controls the transmission of output data and the reception of input data in conformity with the standards of field network 2. More specifically, field network controller 130 serves as a transmission buffer for the data to be output to field device 500 (output data), and as a reception buffer for the data input from field device 500 (input data). The output data generated from calculation by processor 102 is primarily stored in storage 108. The output data to be transferred to a particular field device 500 is read from storage 108 and temporarily held in the transmission buffer. The input data transferred from field device 500 is temporarily held in the reception buffer and is then transferred to storage 108. Further, field network controller 130 transmits the output data from the transmission buffer to field device 500, and receives the input data from field device 500 and stores it in the reception buffer. Field network controller 130 typically provides the functions of a physical layer and a data link layer in field network 2.

In the configuration example of FIG. 2, necessary functions are provided by processor 102 executing programs. However, a part or all of these functions provided may be implemented using a dedicated hardware circuit (e.g., ASIC or FPGA), instead. Alternatively, the principal part of controller 100 may be implemented using hardware in accordance with a general-purpose architecture (e.g., an industrial personal computer based on a general-purpose personal computer). In this case, a virtualization technology may be used to execute a plurality of operating systems (OS) for different uses in parallel, and to execute a necessary application on each OS.

In control system 1 shown in FIG. 2, controller 100, support device 200, and display 400 are configured as separate bodies. However, a part or all of their functions may be performed in a single device, instead.

D. Software Configuration Example of Controller

Figure 3:
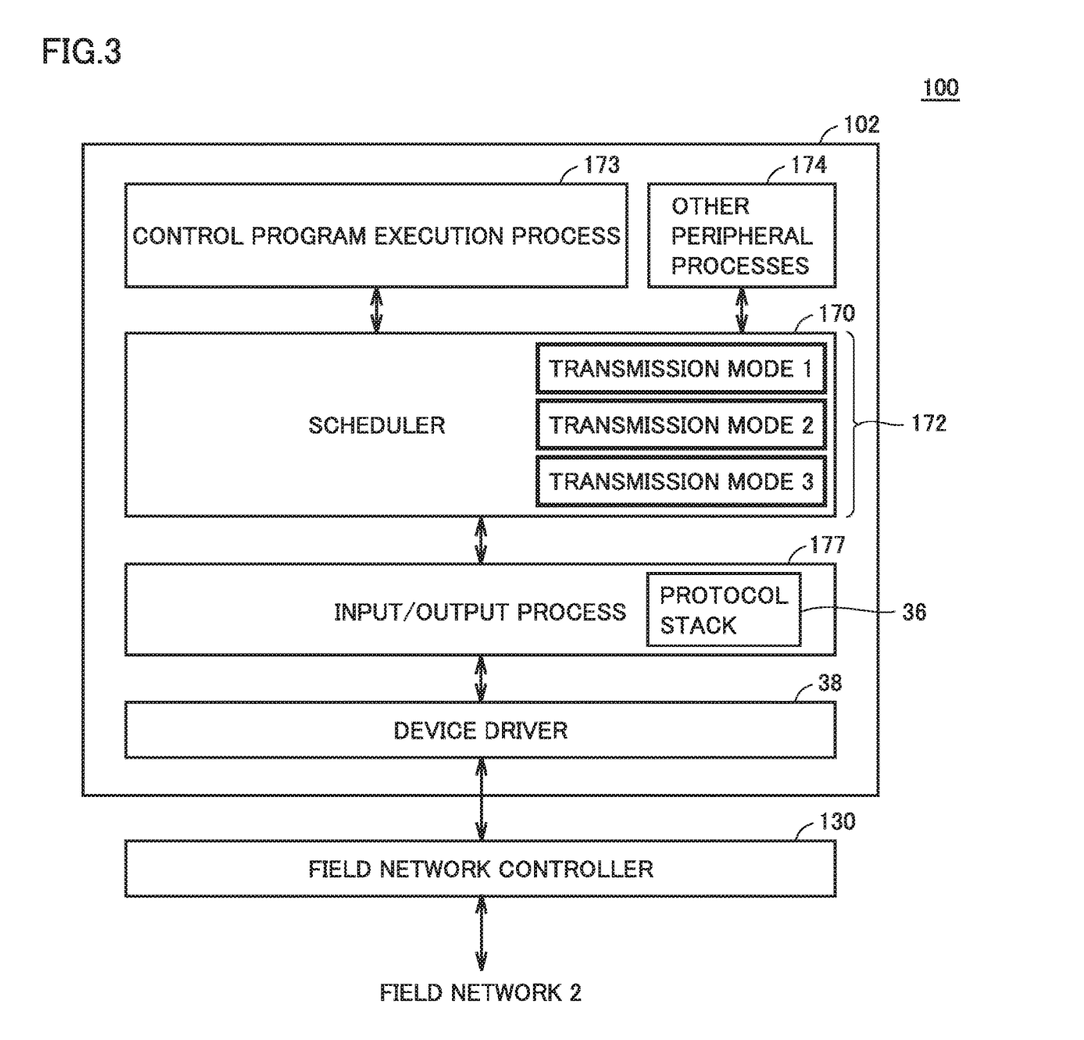
FIG. 3 is a schematic diagram showing a software configuration example of a controller in the present embodiment.

A software configuration example of controller 100 in the present embodiment will now be described. FIG. 3 is a schematic diagram showing a software configuration example of controller 100 in the present embodiment.

With reference to FIG. 3, processor 102 of controller 100 executes a scheduler 170. Scheduler 170 determines, for example, the execution order and the execution interruption among a plurality of processes, in accordance with a predetermined control cycle. Specifically, scheduler 170 assigns processing resources (e.g., processor time and memory) to a control program execution process 173, peripheral processes 174 including various processes, and an input/output process 177, in accordance with, for example, a predetermined precedence and control cycle.

Control program execution process 173 includes a process related to the execution of user program 30 and sequence program 32 (control program).

Input/output process 177 is a process for updating the data exchanged between controller 100 and field device 500 via field network 2. The input/output process includes a process for receiving the input data and transferring it to controller 100 (hereinafter also referred to as a "reception process"), and a process for transmitting the output data from controller 100 to field device 500 (hereinafter also referred to as a "transmission process"). These processes are executed in accordance with protocol stack 36.

Further, processor 102 of controller 100 includes device driver 38 implemented therein for controlling, for example, field network controller 130.

Scheduler 170 performs scheduling for the input/output process and the control program execution process. For scheduling the transmission process in the input/output process, three types of transmission modes (transmission mode 1, transmission mode 2, and transmission mode 3) 172, described later, are prepared. These three transmission modes are different from one another in the timing of frame transmission to field device 500 in one control cycle. Not all of these three transmission modes have to be implemented, but only a necessary transmission mode may be implemented. Additionally or alternatively to the three transmission modes, another transmission mode may be employed.

Which of the three transmission modes to use may be set when support device 200 sets the parameters (configuration) of a device connected to controller 100.

E. Execution Schedule of Tasks

Figure 4:
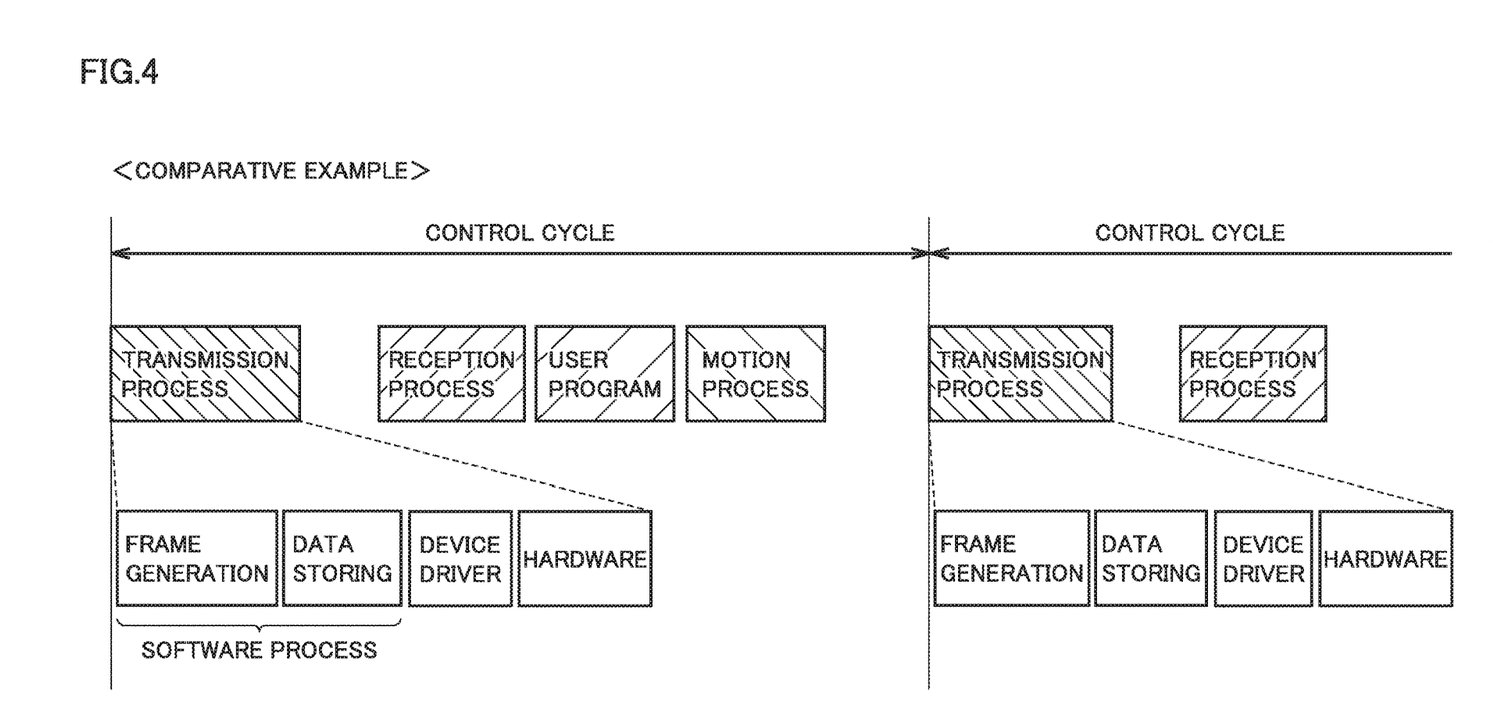
FIG. 4 is a timing chart showing an execution schedule of tasks in a comparative example.

First, an execution schedule of tasks in a comparative example is described with reference to FIG. 4. FIG. 4 is a timing chart showing an execution schedule of tasks in a comparative example.

With reference to FIG. 4, as the tasks to be executed by controller 100, the following processes are set: an input/output process (transmission process and reception process), an output process (user program process) for outputting a control command in accordance with user program 30, and an output process (motion process) for outputting a control command in accordance with a motion instruction included in sequence program 32. These tasks are executed for each control cycle.

The user program process is a process for executing user program 30 and calculating a control command for each control cycle. The motion process is a process for calculating a control command for each control cycle in accordance with a motion instruction. These control commands are directed to at least a part of robot controllers 522, 526 and servo drivers 540, 544. Hereinafter, the user program process and the motion process are also collectively referred to as a control program process.

The transmission process is a process for transmitting the output data (e.g., a control command) generated by the execution of user program 30 and sequence program 32, to field device 500 on field network 2 through field network controller 130. Specifically, the transmission process is constituted of (1) frame generation, (2) data storing, (3) device driver, and (4) hardware. Among these, (1) frame generation, (2) data storing, and (3) device driver are executed by processor 102.

Figure 5:
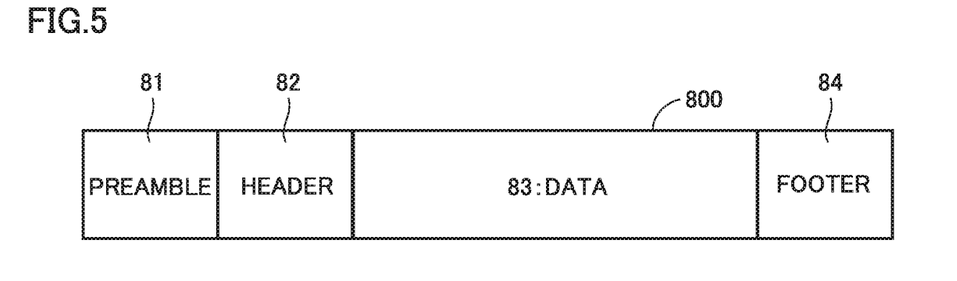
FIG. 5 is a diagram showing a configuration example of a frame.

The (1) frame generation is a process for generating a frame to be transported over field network 2. FIG. 5 shows a configuration example of a frame. As shown in FIG. 5, a frame 800 includes, for example, a preamble part 81, a header part 82, a data part 83, and a footer part 84.

Preamble part 81 contains a preamble representing a synchronization signal indicating the start of the frame. Header part 82 contains the source of the frame, which is a TALKER on field network 2; the destination, which is a LISTENER of the frame, and the type. Various types of addresses can be applied to the source and destination. In the case of an Ethernet-based industrial network, header part 82 is constituted of an Ethernet header and an industrial network header. The Ethernet header includes the source, the destination, the EtherType, and the like; and the industrial network header includes the data size, the type, and the like.

Data part 83 contains the data to be transported via field network 2 (output data and input data). Data part 83 can contain various types of data, including control-system data. The control-system data, which is the data used for controlling a manufacturing system and equipment, includes a control command generated by the execution of user program 30 and sequence program 32. If frame 800 has such control-system data stored as the data, then its source indicates controller 100, and its destination indicates any of field devices 500.

Footer part 84 contains a frame check sequence (FCS) for error detection. In the case of an Ethernet-based industrial network, footer part 84 is constituted of an Ethernet footer. Footer part 84 may further contain an industrial network footer.

The frame configuration in FIG. 5 is by way of example, not by way of limitation. Although the data transported over field network 2 is in the form of a frame in the present embodiment, the data form is not limited to a frame.

In (1) frame generation, processor 102 forms header part 82 and footer part 84 of frame 800 shown in FIG. 5. Specifically, processor 102 stores the source, the destination, the type, and the like in header part 82. Processor 102 stores the address of controller 100 as the source; and identifies any of field devices 500 as a destination of a control command and stores the address of this field device 500 as the destination. Processor 102 further stores the FCS in footer part 84. In the case of an Ethernet-based industrial network, processor 102 forms an Ehternet header and an industrial network header; and an Ethernet footer and an industrial network footer.

In (2) data storing, processor 102 can store various types of data in data part 83 of frame 800. Processor 102 stores, in data part 83 of the frame, a control command generated by the output process (user program process) for outputting a control command in accordance with user program 30, and generated by the output process (motion process) for outputting a control command in accordance with a motion instruction included in sequence program 32, in the previous control cycle. At this time, processor 102 relocates the output data to group together a plurality of pieces of output data directed to the same field device 500, so that the plurality of pieces of output data to be transmitted to the same field device 500 can be collectively transmitted. In the following description, (1) frame generation and (2) data storing are also collectively referred to as "the storing of output data in a frame".

In (3) device driver, processor 102 controls field network controller 130. Processor 102 transfers, to field network controller 130, the frame in which the output data is stored.

In (4) hardware, field network controller 130 transmits the transferred frame to a destination (field device 500) via field network 2.

The reception process is a process for transmitting the input data, which has been transferred from field device 500 on field network 2, to processor 102 through field network controller 130. Specifically, the input data transmitted from a destination (field device 500) via field network 2 is received at field network controller 130, and is stored in the internal reception buffer. The input data stored in the reception buffer is then transferred to processor 102. Processor 102 copies the transferred input data into the main memory. At this time, processor 102 relocates the input data copied into main memory 106, so that the input data will be in an appropriate form for use by the control program.

If EtherCAT (registered trademark) is employed for field network 2, a single frame includes the output data directed to field devices 500 and the input data from field devices 500. When a frame is transmitted from master controller 100, the transmitted frame is sequentially transferred through daisy-chained field devices 500. Field devices 500, other than controller 100, are set as slaves. When the frame reaches the end field device 500, the frame turns back the full-duplex communication path, through slave field devices 500, to controller 100 again. On the outward path, each field device 500 passes the frame in a first in first out (FIFO) method, while selectively taking in the output data directed to the slave, and writing, in an appropriate position in the frame, the input data generated at the slave. On the return path, each slave passes the frame without reading the output data or writing the input data.

Thus, in the case of EtherCAT (registered trademark), the transmission and reception of a single frame corresponds to the transfer of output data from processor 102 to each field device 500, and the transfer of input data from each field device 500 to processor 102, performed by field network controller 130.

If EtherCAT (registered trademark) is employed for field network 2, when a frame including the output data is transmitted and then returned through slave field devices 500, the frame will include the input data. Therefore, as to the execution order, the reception process is executed after the transmission process.

After the reception process is executed, processor 102 sequentially executes the user program process and the sequence process, using the input data. That is, processor 102 executes the control program for generating output data using the input data. In accordance with the execution result of the control program, processor 102 performs the transmission of output data and the reception of input data in the next control cycle.

In this way, controller 100 controls an object of control by sequentially repeating the transmission of output data (transmission process), the reception of input data (reception process), and the execution of a control program for generating output data using the input data (control program process). Specifically, processor 102 executes the control program (user program 30 and sequence program 32) stored in storage 108, and, in accordance with the execution result, field network controller 130 performs the transmission of output data and the reception of input data for each control cycle.

In the comparative example shown in FIG. 4, when a control cycle starts, the transmission process is performed, where processor 102 sequentially executes (1) frame generation, (2) data storing, and (3) device driver; and field network controller 130 executes (4) hardware, so that the frame is transmitted to field network 2. Among these, (1) frame generation and (2) data storing (i.e., the storing of output data in a frame) is implemented by processor 102's software process. Accordingly, an increased amount of data to be processed by processor 102 tends to cause greater variation in the processing time. As a result, with an increased amount of data, there may be greater variation in the timing of frame transmission from controller 100 to field network 2.

Thus, in the comparative example, the amount of data processing in the transmission process affects the degree of variation in the timing of frame transmission from controller 100 to field network 2, making it difficult to ensure precise timing of frame transmission. The variation in the timing of frame transmission may, in turn, affect the timing of frame reception at field device 500 on field network 2. This may decrease the accuracy of synchronization among a plurality of field devices 500.

To address this, in controller 100 in the present embodiment, in the transmission process, processor 102 executes, in the current control cycle, at least a part of the storing of output data in a frame that is to be executed in the next control cycle. That is, scheduling for the transmission process is executed so that at least a part of the software process included in the transmission process that is to be executed in the next control cycle is executed in the current control cycle.

This reduces the amount of data processing in the software process to be executed in the transmission process in the next control cycle, thereby reducing the variation in the processing time required for the software process. With the reduced variation in the processing time for the software process, the variation in the timing of frame transmission can also be reduced. This can ensure the timing of frame reception at field device 500 on field network 2, thus ensuring the accuracy of synchronization among a plurality of field devices 500.

Hereinafter scheduling for the transmission process in the present embodiment is described. The execution schedules of tasks shown in FIGS. 6 to 8, i.e., the assignments of processor resources, are executed by scheduler 170 (see FIG. 3).

As to the transmission process, scheduler 170 can selectively execute three types of transmission modes (transmission mode 1, transmission mode 2, and transmission mode 3), based on the configuration information (configuration) of the device connected to controller 100 set by support device 200.

Specifically, transmission mode 1 is applicable to a configuration in which the exchange of data is not performed between controller 100 and another device (such as server 300 and display 400) connected to higher-level network 6. On the other hand, transmission mode 2 and transmission mode 3 are applicable to a configuration in which the exchange of data is performed between controller 100 and another device connected to higher-level network 6.

The exchange of data with another device connected to higher-level network 6 is executed using the remaining time after the execution of the control program in a control cycle. In some cases, the output data generated by the execution of the control program is updated as a result of the exchange of data. In this case, the updated output data needs to be stored in a frame. Transmission mode 2 and transmission mode 3 define the scheduling for the transmission process in the case in which the output data is updated.

Scheduler 170 does not perform dynamic scheduling where the three transmission modes are selected as appropriate during execution of tasks. This is because, since the three transmission modes require different lengths of time for the transmission process, dynamically switching among the transmission modes would cause variation in the transmission process time. This involves the risk of occurrence of variation in the timing of frame reception at field device 500.

f1. Transmission Mode 1

Figure 6:
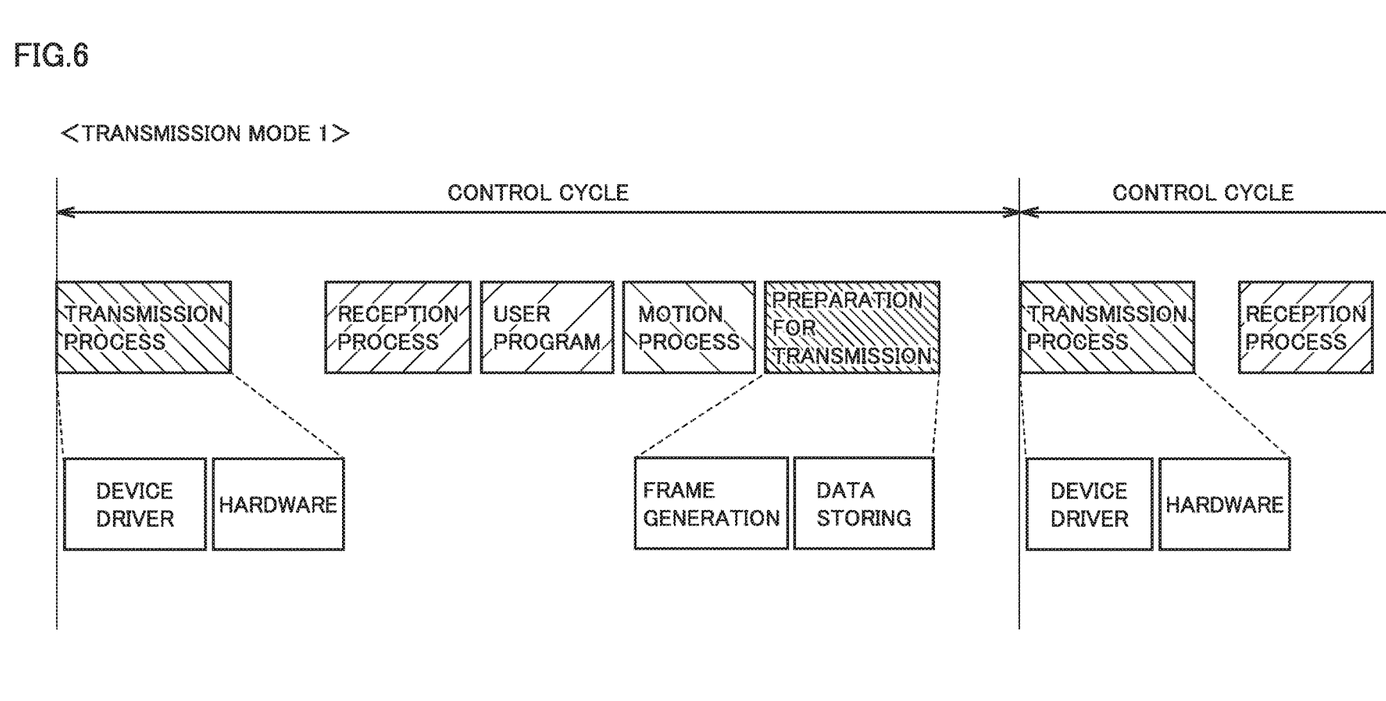
FIG. 6 is a timing chart showing a first configuration example of an execution schedule of tasks in the present embodiment.

FIG. 6 is a timing chart showing a first configuration example of an execution schedule of tasks in the present embodiment. The first configuration example shows an execution schedule of tasks of when transmission mode 1 is selected.

With reference to FIG. 6, in the first configuration example, among (1) frame generation, (2) data storing, (3) device driver, and (4) hardware which constitute the transmission process, (1) frame generation and (2) data storing are executed after the execution of the control program in the current control cycle. When the next control cycle starts, (3) device driver and (4) hardware are executed.

As compared with the comparative example shown in FIG. 4, in the first configuration example shown in FIG. 6, the storing of output data in a frame in the transmission process is moved forward using the remaining time after the execution of the control program.

As described above, since the storing of output data in a frame is implemented by processor 102's software process, an increased amount of data processing tends to cause greater variation in the processing time. Accordingly, if the storing of output data in a frame ((1) frame generation and (2) data storing) is executed when the next control cycle starts, as in the comparative example in FIG. 4, there may arise variation in the timing of frame transmission from controller 100.

By contrast, in the first configuration example, the storing of output data in a frame, which may cause variation in the transmission timing, is moved forward to the current control cycle, thereby reducing the variation in the timing of frame transmission from controller 100 in next control cycle. Accordingly, the timing of frame transmission can be ensured, thus ensuring the accuracy of synchronization among a plurality of field devices 500.

f2. Transmission Mode 2

Figure 7:
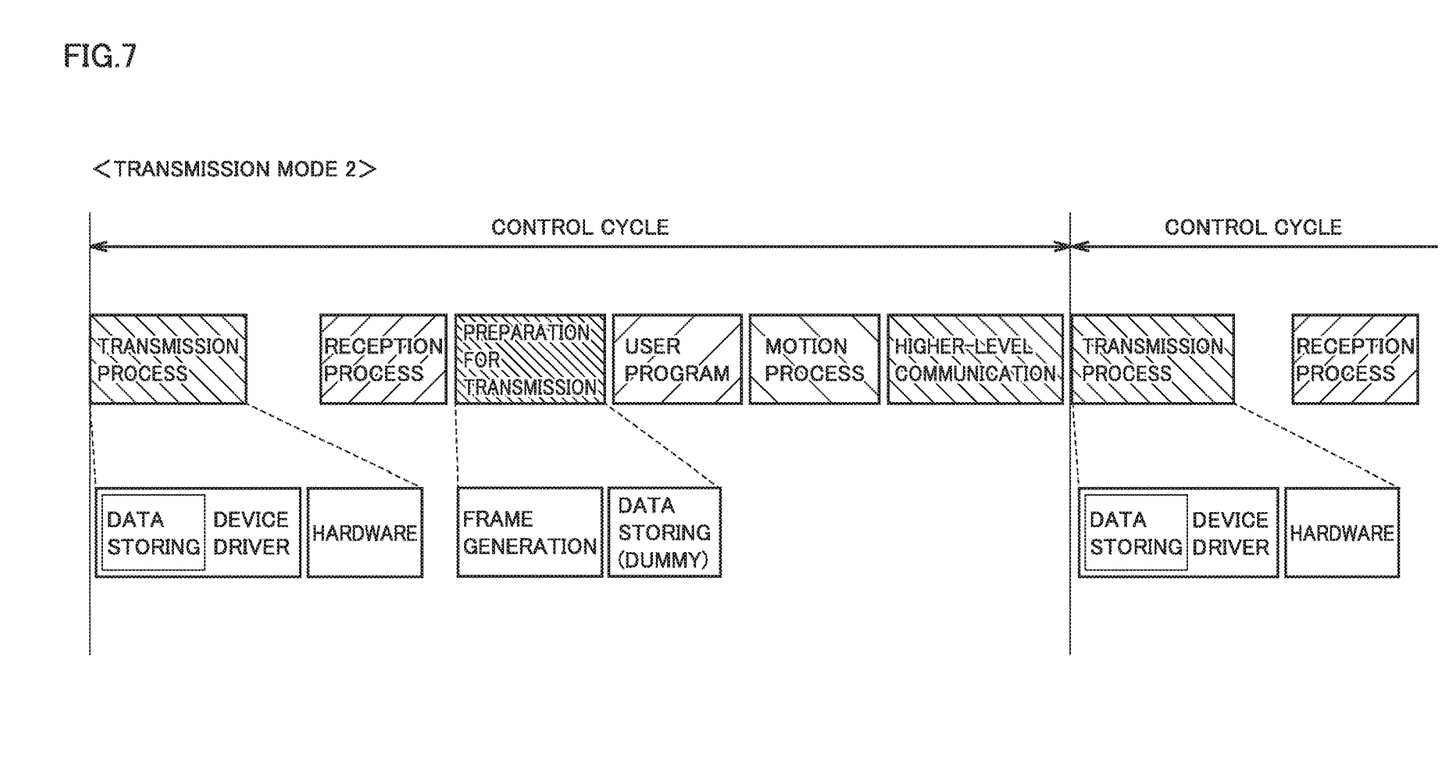
FIG. 7 is a timing chart showing a second configuration example of an execution schedule of tasks in the present embodiment.

FIG. 7 is a timing chart showing a second configuration example of an execution schedule of tasks in the present embodiment. The second configuration example shows an execution schedule of tasks of when transmission mode 2 is selected.

With reference to FIG. 7, in the second configuration example, among (1) frame generation, (2) data storing, (3) device driver, and (4) hardware which constitute the transmission process, (1) frame generation is executed after the execution of the reception process before the execution of the user program in the current control cycle. When the next control cycle starts, (2) data storing, (3) device driver, and (4) hardware are sequentially executed.

In the second configuration example, a frame is generated before the output data is generated by the execution of the control program. Accordingly, at the stage of (1) frame generation, dummy data (i.e., data that does not specify control) is temporarily stored in the data part of the frame. After the dummy data is stored, the user program process and the motion process are sequentially executed.

After the motion process is executed, the exchange of data is performed between controller 100 and another device (such as server 300 and display 400) via higher-level network 6. In some cases, the output data is updated as a result of the exchange of data.

In the second configuration example, when the next control cycle starts, processor 102 executes a rewrite process, as (2) data storing, where the dummy data. stored in the frame is rewritten with the output data generated by the control program. This output data includes the data updated as a result of communication with another device via higher-level network 6. After the output data is stored, (3) device driver and (4) hardware are sequentially executed.

In the second configuration example, (1) frame generation in the software process is moved forward. Thus, as compared with the comparative example in FIG. 4, the amount of data processing in the software process to be executed in the transmission process in the next control cycle is reduced. With the reduced amount of data processing in the software process, the variation in the processing time can also be reduced, resulting in reducing the variation in the timing of frame transmission. This can ensure the timing of frame reception at field device 500 on field network 2, thus ensuring the accuracy of synchronization among a plurality of field devices 500.

f3. Transmission Mode 3

Figure 8:
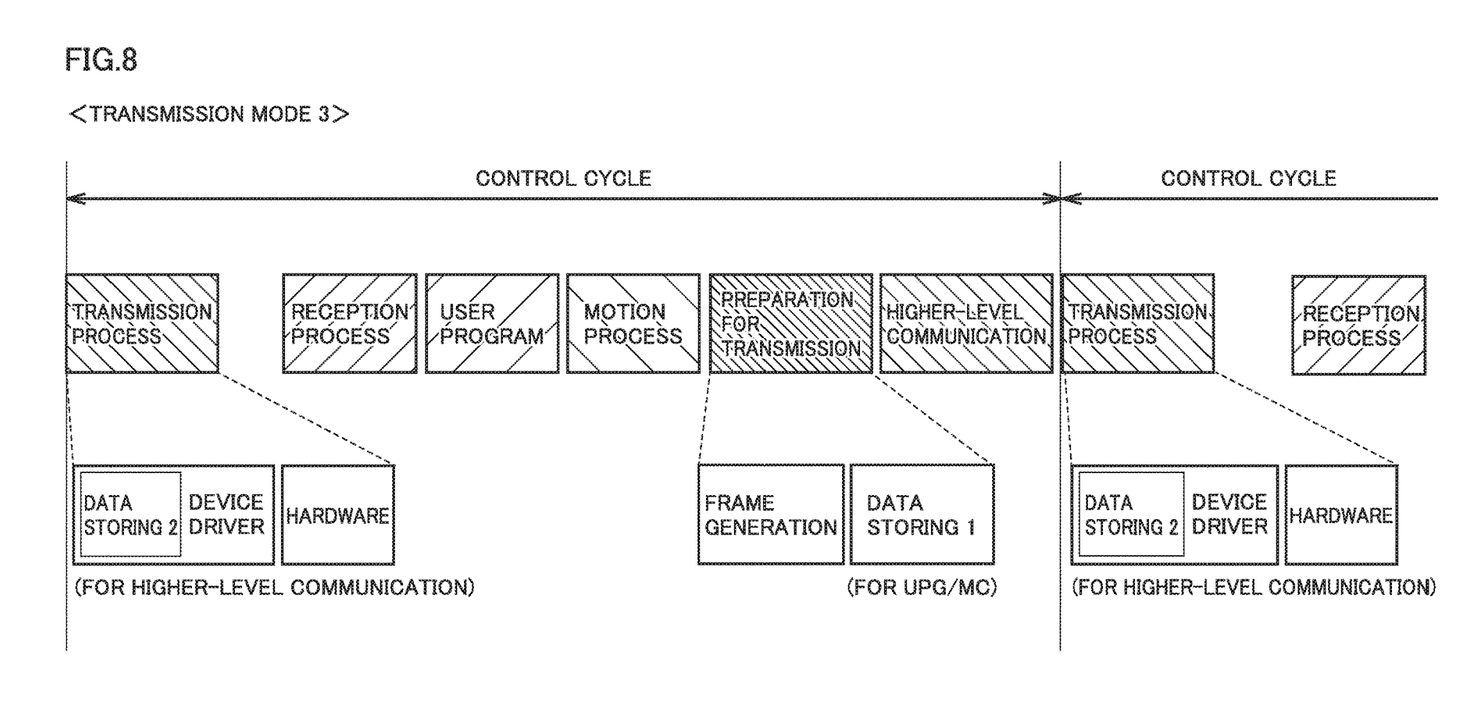
FIG. 8 is a timing chart showing a third configuration example of an execution schedule of tasks in the present embodiment.

FIG. 8 is a timing chart showing a third configuration example of an execution schedule of tasks in the present embodiment. The third configuration example shows an execution schedule of tasks of when transmission mode 3 is selected.

With reference to FIG. 8, in the third configuration example, among (1) frame generation, (2) data storing, (3) device driver, and (4) hardware which constitute the transmission process, (1) frame generation and (2) data storing are executed after the execution of the control program in the current control cycle. In this configuration example, after the execution of the control program, the exchange of data is performed between controller 100 and another device via higher-level network 6, which may cause an update of the output data. Accordingly, when the next control cycle starts, the storing of the updated output data in a frame is executed first. After the output data is stored, (3) device driver and (4) hardware are sequentially executed.

In the third configuration example, (1) frame generation and (2) data storing in the software process are moved forward. Thus, as compared with the comparative example in FIG. 4, the amount of data processing in the software process to be executed in the transmission process in the next control cycle is reduced. With the reduced amount of data processing in the software process, the variation in the processing time can also be reduced, thereby reducing the variation in the timing of frame transmission. This can ensure the timing of frame reception at field device 500 on field network 2, thus ensuring the accuracy of synchronization among a plurality of field devices 500.

In the third configuration example, the amount of data processing at the start of the next control cycle can be further reduced, as compared with the second configuration example. Therefore, the timing of frame transmission in a control cycle can be more precisely ensured.

H. Additional Description

The embodiments as described above include the following technical idea.

Configuration 1

A controller (1) that controls an object of control, the controller (1) comprising:

a processor (102); and a communication circuit (130) that executes transmission of output data to the object of control, and reception of input data from the object of control, wherein the controller controls the object of control by sequentially repeating, on a predetermined control cycle, the transmission of the output data, the reception of the input data, and execution of a control program for generating the output data using the input data, in the transmission of the output data, the processor executes storing of the output data in a frame, the output data having been generated by the execution of the control program in a previous control cycle, and control of the communication circuit such that the frame, in which the output data is stored, is transmitted to the object of control, and the processor executes, in a current control cycle, at least a part of the storing of the output data in a frame that is to be executed in a next control cycle.

Configuration 2

The controller according to configuration 1, wherein the processor in the current control cycle, executes the storing of the output data in a frame that is to be executed in the next control cycle, after the execution of the control program, and when the next control cycle starts, executes the control of the communication circuit.

Configuration 3

The controller according to configuration 1, wherein the processor in the current control cycle, executes a part of the storing of the output data in a frame that is to be executed in the next control cycle, and when the next control cycle starts, sequentially executes a remaining part of the storing of the output data in a frame, and the control of the communication circuit.

Configuration 4

The controller according to configuration 3, wherein the storing of the output data in a frame includes generation of the frame, and storing of the output data in the generated frame, the controller exchanges data with another device (300, 400) via a higher-level network (6), and when the output data is updated as a result of the exchange of data with the other device after the execution of the control program in a control cycle, the processor in the current control cycle, executes the generation of the frame that is to be executed in the next control cycle, after the execution of the reception of the input data and before the execution of the control program, and when the next control cycle starts, executes the storing of the output data.

Configuration 5

The controller according to configuration 3, wherein the storing of the output data in a frame includes generation of the frame, and storing of the output data in the generated frame, the controller exchanges data with another device via a higher-level network, and when the output data is updated as a result of the exchange of data with the other device after the execution of the control program in a control cycle, the processor in the current control cycle, executes the storing of the output data in a frame that is to be executed in the next control cycle, after the execution of the control program and before the execution of the exchange of data with the other device, and when the next control cycle starts, sequentially executes storing of the updated output data in the frame, and the control of the communication circuit.

Configuration 6

A control system comprising:

a controller; and one or more devices (500) that work in accordance with a control command from the controller, wherein the controller and the one or more devices have their respective timers (TMR) that are time-synchronized with each other, the controller including:

a processor; and a communication circuit that executes transmission of the control command to the one or more devices, and reception of input data from the one or more devices, wherein the controller controls the one or more devices by sequentially repeating, on a predetermined control cycle, the transmission of the control command, the reception of the input data, and execution of a control program for generating the control command using the input data, in the transmission of the control command, the processor executes storing of the control command in a frame, the control command having been generated by the execution of the control program in a previous control cycle, and control of the communication circuit such that the frame, in which the control command is stored, is transmitted to the one or more devices, and the processor executes, in a current control cycle, at least a part of the storing of the control command in a frame that is to be executed in a next control cycle.

It should be understood that the embodiments disclosed herein are by way of example in every respect and not by way of limitation. The scope of the present invention is defined not by the above description but by the terms of the claims, and is intended to include any modification within the meaning and scope equivalent to the terms of the claims.

REFERENCE SIGNS LIST

1: control system; 30: user program; 32: sequence program; 34: system program; 36: protocol stack; 38: device driver; 40: setting information; 81: preamble part; 82: header part; 83: data part; 84: footer part; 100: controller; 102: processor; 104: chip set; 106: main memory; 108: storage; 110: higher-level network controller; 112: USB controller; 114: memory card interface; 116: memory card; 120: internal bus controller; 122: I/O unit; 130: field network controller; 170: scheduler; 172: transmission mode; 173: control program execution process; 174: other peripheral processes; 177: input/output process; 200: support device; 300: server; 400: display; 500: field device; 510: remote IO device; 520, 524: robot; 522, 526: robot controller; 540, 544: servo driver; 542, 546: servomotor; 800: frame

The invention claimed is:

1. A controller that controls an object of control, the controller comprising:
   a processor; and
   a communication circuit that executes transmission of output data to the object of control, and reception of input data from the object of control, wherein
   the controller controls the object of control by sequentially repeating, on a predetermined control cycle, the transmission of the output data, the reception of the input data, and execution of a control program for generating the output data using the input data,
   in the transmission of the output data, the processor executes
      storing the output data to be included in a frame, in a transmission buffer, the output data having been generated by the execution of the control program in a previous control cycle, and
      control of the communication circuit such that the frame including the output data, is transmitted to the object of control, and
   the processor executes, in a current control cycle, at least a part of storing, in the transmission buffer, output data to be included in a frame that is to be transmitted in a next control cycle.

2. The controller according to claim 1, wherein the processor
   in the current control cycle, executes the storing of the output data to be included in the frame that is to be transmitted in the next control cycle, after the execution of the control program, and
   when the next control cycle starts, executes the control of the communication circuit.

3. The controller according to claim 1, wherein the processor
   in the current control cycle, executes a part of the storing of the output data to be included in the frame that is to be transmitted in the next control cycle, and
   when the next control cycle starts, sequentially executes a remaining part of the storing of the output data, and the control of the communication circuit.

4. The controller according to claim 3, wherein
   the storing of the output data to be included in the frame includes
      generation of the frame, and
      storing of the output data in the generated frame,
   the controller exchanges data with an other another device via a higher-level network, and
   when the output data is updated as a result of the exchange of data with the other device after the execution of the control program in a control cycle, the processor, in the current control cycle, generates the frame that is to be transmitted in the next control cycle, after the execution of the reception of the input data and before the execution of the control program, and when the next control cycle starts, executes the storing of the output data.

5. The controller according to claim 3, wherein
   the storing of the output data to be included in the frame includes
      generation of the frame, and
      storing of the output data in the generated frame,
   the controller exchanges data with an other another device via a higher-level network, and
   when the output data is updated as a result of the exchange of data with the other device after the execution of the control program in a control cycle, the processor, in the current control cycle, executes the storing of the output data that is to be included in a frame that is to be transmitted in the next control cycle, after the execution of the control program and before the execution of the exchange of data with the other device, and when the next control cycle starts, sequentially executes storing of the updated output data, the updated output data to be included in the frame, and the control of the communication circuit.

6. A control system comprising:
   a controller; and
   one or more devices that work in accordance with a control command from the controller, wherein
   the controller and the one or more devices have their respective timers that are time-synchronized with each other,
   the controller including:
      a processor; and
      a communication circuit that executes transmission of the control
   command to the one or more devices, and reception of input data from the one or more devices, wherein
   the controller controls the one or more devices by sequentially repeating, on a predetermined control cycle, the transmission of the control command, the reception of the input data, and execution of a control program for generating the control command using the input data,
   in the transmission of the control command, the processor executes
      storing the control command to be included in a frame, in a transmission buffer, the control command having been generated by the execution of the control program in a previous control cycle, and
      control of the communication circuit such that the frame including the control command is transmitted to the one or more devices, and
   the processor executes, in a current control cycle, at least a part of storing, in the transmission buffer, as control command to be included in a frame that is to be transmitted in a next control cycle.

* * * * *